Oct. 5, 1954

W. H. INGERSOLL 2,691,130

BRIDGE CONTROL CIRCUITS

Filed Aug. 11, 1952

INVENTOR.
WARD H. INGERSOLL
BY
George H. Fisher
ATTORNEY

Oct. 5, 1954
W. H. INGERSOLL
2,691,130
BRIDGE CONTROL CIRCUITS
Filed Aug. 11, 1952
2 Sheets-Sheet 2
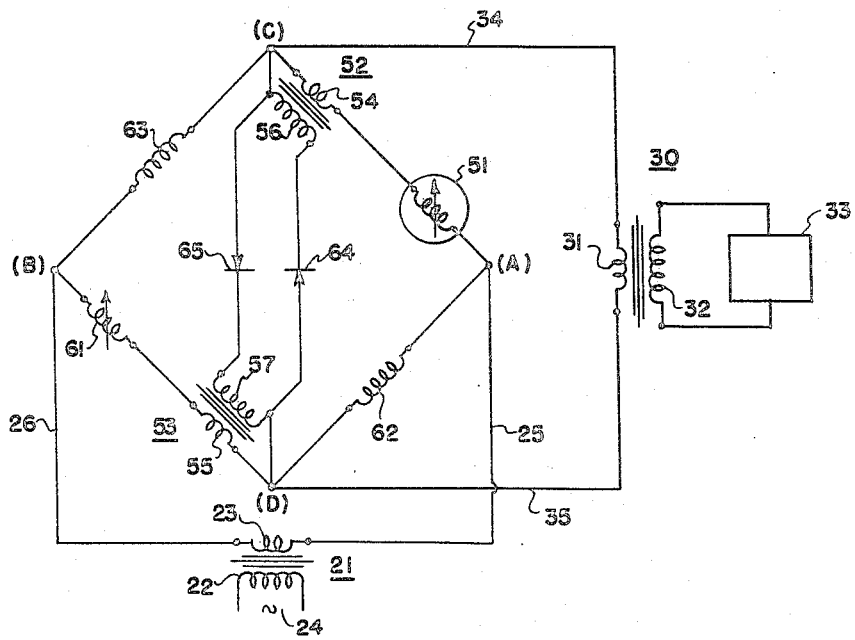
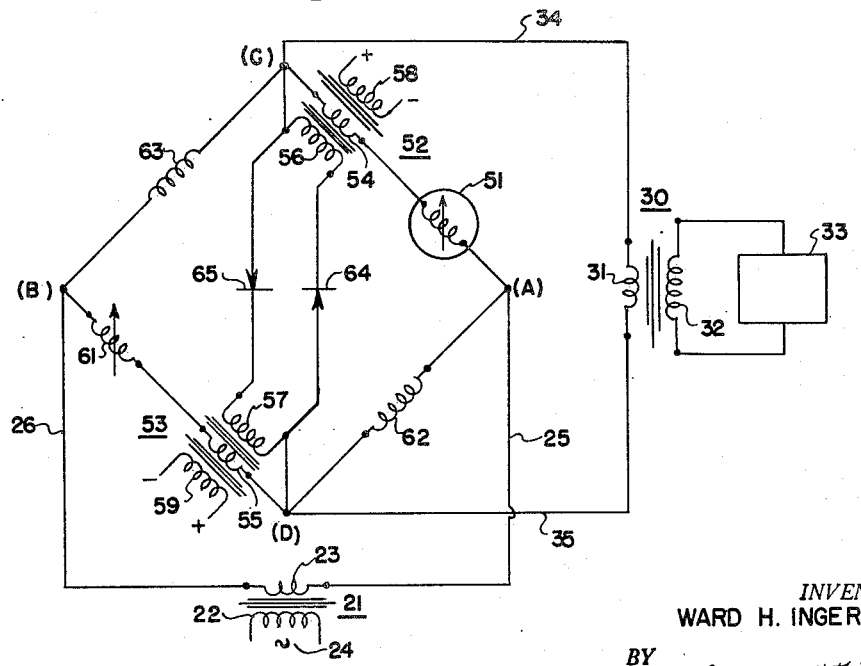
INVENTOR.
WARD H. INGERSOLL
BY George H. Fisher
ATTORNEY Patented Oct. 5, 1954

2,691,130

UNITED STATES PATENT OFFICE 2,691,130

BRIDGE CONTROL CIRCUITS

Ward H. Ingersoll, St. Paul, Minn., assignor to Minneapolis-Honeywell Regulator Company, Minneapolis, Minn., a corporation of Delaware Application August 11, 1952, Serial No. 303,802

14 Claims. (Cl. 323—75)

This invention pertains to bridge networks, and more specifically to bridge networks, the unbalance of which operates a load device.

An object of my invention is to provide a normally balanced bridge network including a condition responsive variable inductance, the network remaining balanced for a variation in one sense of the variable inductance and the network becoming greatly unbalanced for a variation of the variable inductance in a sense opposite to said one sense.

Another object of the invention is to provide in a bridge network, the unbalance of which energizes a load device, an arrangement of saturable reactors including control windings and asymmetrically conductive means connected with said control windings which will exert a negative feedback effect for tendencies of the network to become unbalanced in one sense and a positive feedback effect for tendencies of the network to become unbalanced in the sense opposite to said one sense.

A further object of the invention is to provide a normally balanced bridge network wherein a load device connected to the output diagonal will be energized when a condition responsive variable inductance included in the network is varied in one sense, but will not be energized when the condition responsive varable inductance is varied in the opposite sense.

These and other objects will become more evident from an examination of the following specification and claims.

Included in the specification are the following figures wherein:

Figure 3 shows a further embodiment of the invention.

Figure 4 shows a modification of the circuitry shown in Figure 3.

An examination of Figures 1 to 4 will reveal that certain parts of all of the figures are the same, and consequently will be identified as such in the following specification.

Figure 1:
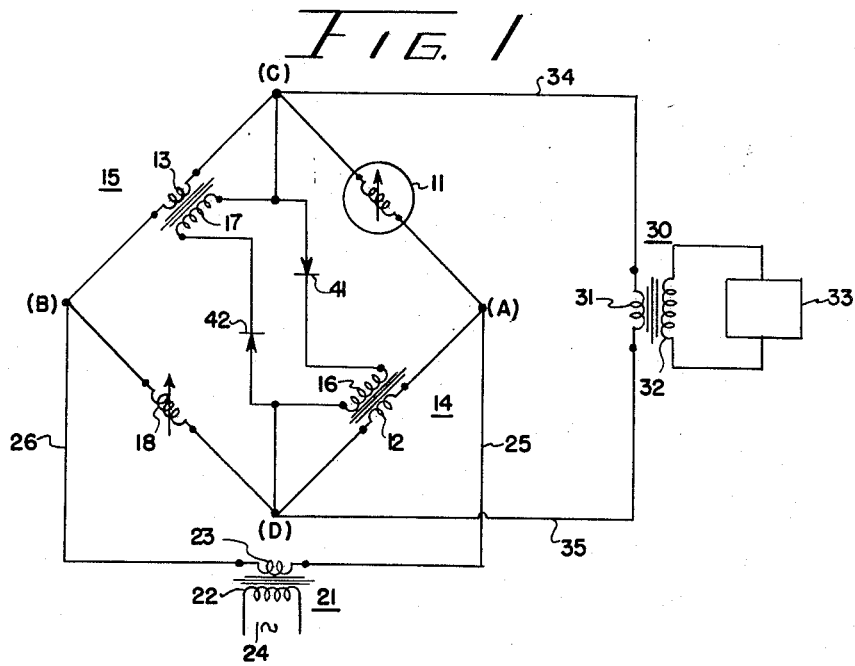
Figure 1 shows one embodiment of the invention.

Figure 1 shows a bridge network having four legs joined at four junction points, A, B, C, and D. Connected between points A and C is a condition responsive variable inductor 11, the inductance of which varies in accordance to changes of physical conditions. Connected between points A and D, and points C and B respectively are power windings 12 and 13 of saturable reactors 14 and 15. Connected between points B and D is an adjustable inductance 18.

Points A and B serve as input terminals of the bridge network and are connected by leads 25 and 26 respectively to a secondary winding 23 of an input transformer 21, which has a primary winding 22 energized from a source of alternating current 24.

Points C and D of the bridge network serve as output terminals and are connected by leads 34 and 35 respectively to primary winding 31 of an output transformer 30. A secondary winding 32 of the output transformer 30 is connected to a load device 33.

Asymmetrically conductive devices 41 and 42, shown herein as half-wave rectifiers, are reversibly connected to the output terminals C and D. That is, the directions of highest impedance of the rectifiers 41 and 42 lie in opposite directions. As shown, rectifier 41 would conduct current when point C is positive with respect to point D and rectifier 42 would conduct current when point D is positive with respect to point C. Control windings 16 and 17 of saturable reactors 14 and 15 respectively are serially connected with the half-wave rectifiers 41 and 42 between the output terminals C and D.

Under normal conditions, the bridge network shown in Figure 1 is balanced. That is, the ratio of the reactance of the condition responsive variable reactor 11 to the reactance of saturable reactor 15 is equal to the ratio of the reactance of saturable reactor 14 to the reactance of the adjustable inductance 18. Under these conditions, currents will flow, when transformer 21 is energized by the source of alternating current 24, alternately through the arms of the bridge A—C—B, and A—D—B. Since the above ratios of reaactances are equal, points C and D will be at the same potential, and no current will flow through the primary 31 of output transformer 30 or through the serially connected control windings 16 and 17 and asymmetrically conductively devices 41 and 42 respectively.

Should the conditions to which condition responsive variable inductance 11 responds cause the conditional responsive variable inductance 11 to decrease in inductance, the bridge will tend to become unbalanced and the following will result. At the interval of time when point A is positive with respect to point B, point C will be more positive than point D due to the unbalance and consequently current flowing from point A to point B along path A—C—B will divide at point C, part of it flowing through rectifier 41 and control winding 16 of saturable reactor 14 to point D then through adjustable inductance 18 to point B, and the remainder flowing from point C to point B through the power winding 13 of saturable reactor 15. Current will also flow from point A through the power winding 12 of saturable reactor 14 and through adjustable inductance 18 to point B. The unidirectional current flowing through the control winding 16 of saturable reactor 14 decreases the impedance of saturable reactor 14 in the manner well known by those skilled in the art thus tending to bring back to balance the bridge network by making the ratio of the reactance of condition responsive variable conductance 11 to saturable reactor 15 nearly the same as the impedance of saturable reactor 14 to adjustable inductance 18.

The bridge is not brought back to a perfect balance since a slight amount of current must continue to flow through the control winding 16 of saturable reactor 14. However, the bridge circuit is close enough to a balance point at all times so that the difference of potential between points C and D is of a relatively low magnitude. The characteristics of load device 33 are such that it will not be activated for low levels of potential difference between points C and D.

At the interval of time when point B is positive with respect to point A, point D will be more positive than point C due to the unbalance and consequently current will flow from point B through adjustable inductance 18 to point D, then dividing, part of it flowing through the power winding 12 of saturable reactor 14 to point A, and the remainder flowing through rectifier 42 and the control winding 17 of saturable reactor 15 to point C and thence through condition responsive variable inductance 11 to point A. During the same interval of time, current will flow from point B through the power winding 13 of saturable reactor 15 and the condition responsive variable inductance 11 to point A. The unidirectional current flowing through control winding 17 of saturable reactor 15 lowers the reactance of saturable reactor 15 and again the bridge tends to remain balanced due to the fact that the ratio of the reactance of condition responsive variable inductance 11 to the reactance of saturable reactor 15 is nearly the same as the reactance of saturable reactor 14 to the reactance of adjustable inductance 18.

Should the inductance and consequently the reactance of condition responsive variable inductance 11 increase, the bridge will tend to become unbalanced in the sense opposite to the unbalance caused by the decrease of condition responsive variable inductance 11 and the following will occur. At the instant of time when point A is positive with respect to point B, point D will be more positive than point C due to the unbalance and consequently current will flow from point A through the power winding 12 of saturable reactor 14 to point D, then dividing, part of it flowing through rectifier 42 and control winding 17 of saturable reactor 15 to point C, thence through the power winding 13 of saturable reactor 15 to point B, and the remainder flowing through adjustable inductance 18 to point B. During the same interval of time, current will also flow from point A through condition responsive variable inductance 11 and the power winding 13 of saturable reactor 15 to point B. The unidirectional current flowing through control windings 17 of saturable reactor 15 lowers the reactance of the same, thus further upsetting the balance of the bridge network. As a consequence of this large unbalance, point C and point D will be at greatly different levels of potential and consequently a substantial current will flow from point D, through lead 35, primary 31 of output transformer 30, and lead 34 to point C thus energizing the load device 33.

At the interval of time when point B is positive with respect to point A, point C will be more positive than point D due to the unbalance and consequently current flowing from point B through the power winding 13 of saturable reactor 15 to point C will divide, part of its flowing through rectifier 41 and the control winding 16 of saturable reactor 14 to point D and thence through the power winding 12 of saturable reactor 14 to point A, and the remainder flowing through condition responsive variable inductance 11 to point A. During the same interval of time, current will also flow from point B through the adjustable inductance 18 and the power winding 12 of saturable reactor 14 to point A. The unidirectional current flowing through the control winding 16 of saturable reactor 14 lowers the reactance of saturable reactor 14, and thus the bridge is further unbalanced due to the fact that condition responsive variable inductance 11 was increased and now the reactance of saturable reactor 14 has decreased. As a result of this unbalance, points C and D will remain at substantially different levels of potential and the load device will continue to operate or be energized by virtue of the current flowing from point C to point D through lead 34, primary 31 of output transformer 30 and lead 35.

Figure 2:
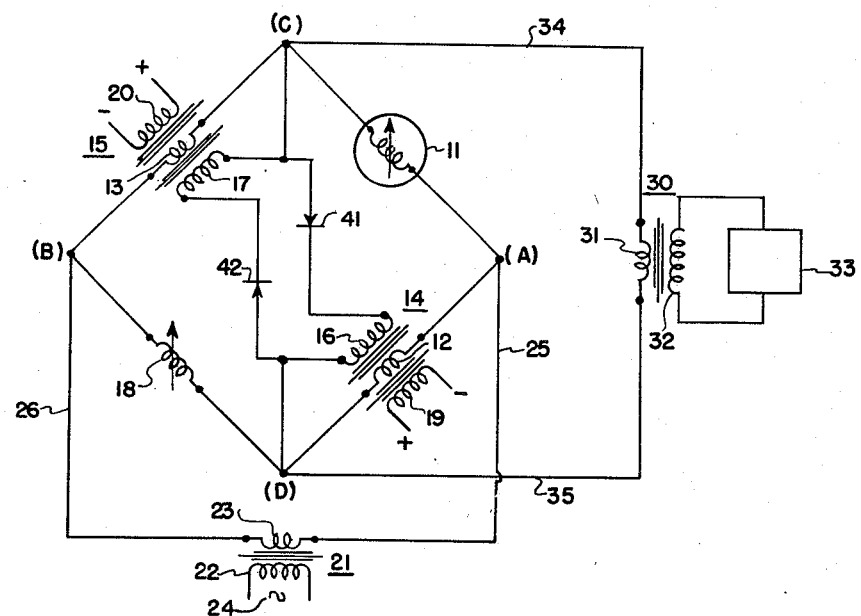
Figure 2 shows a modification of the circuitry shown in Figure 1.

The modification of Figure 1, as shown in Figure 2, indicates circuitry which is similar to Figure 1 with the exception that saturable reactors 14 and 15 have additional biasing windings 19 and 20 respectively. Biasing windings 19 and 20 are energized by unidirectional current as indicated by the polarity signs on Figure 2, so that their magnetic effects on the saturable reactors will be opposing the magnetic effects developed by the unidirectional currents flowing through the control windings 16 and 17. The result of this type of an arrangement, as is well known by those skilled in the art, is that a flow of current through control winding 16, for example, of saturable reactor 14 will cause the reactance of saturable reactor 14 to increase, rather than decrease as was the case of the circuitry shown in Figure 1. With this modification, the action of the bridge network shown in Figure 2 will be opposite to the action of the bridge network shown in Figure 1. That is, an unbalance of the bridge network caused by a decrease of the inductance of condition responsive variable inductance 11 will result in a further unbalance of the bridge thus energizing load device 33, and an increase in the reactance of condition responsive variable inductance 11 will result in the bridge remaining substantially balanced and consequently no energization of the load device 33.

Should the direction of the unidirectional current flowing through the biasing winding 19 and 20 be reversed so that the magnetic effects of the biasing windings 19 and 20 aid the magnetic effects of the control windings 16 and 17, then the operation of the bridge network shown in Figure 2 will be similar to the operation of the bridge network shown in Figure 1. The effect of the biasing windings in this case would be to increase the sensitivity of the circuit.

The bridge network shown in Figure 3 is constructed as follows. Between points A and C are a condition responsive variable inductance 51, which is similar in operation to the condition responsive variable inductance 11 of Figures 1 and 2, and a power winding 54 of a saturable reactor 52. Connected between points B and D of the bridge network are a power winding 55 of a saturable reactor 53 and an adjustable inductance 61. Between points A and D and points C and B respectively are inductances 62 and 63. Reversibly connected to the output terminals C, D are asymmetrically conductive devices such as half-wave rectifiers 64 and 65. Serially connected with rectifiers 64 and 65 are the control windings 56 and 57 respectively of saturable reactors 52 and 53. The remainder of the circuitry is identical to that described in connection with Figure 1 and Figure 2.

The operation of the bridge network shown in Figure 3 is as follows. Under normal operation of the bridge network, adjustable inductance 61 is varied until the bridge is balanced. At this point the ratio of the reactance of the arm AC of the bridge to the reactance of the arm CB is equal to the ratio of the reactance of the arm AD to the arm DB. Under these conditions, currents will flow, by virtue of the energization of the input transformer 21 from the source of alternating current 24, alternately through the bridge network through the paths ACB and ADB. Under this condition of balance, point C and D will always be at the same potential and consequently no current will flow through primary 31 of output transformer 30 or through the serially connected control windings 56 and 57 and rectifiers 64 and 65.

When condition responsive variable inductance 51 is effected so that its reactance is decreased, the bridge will tend to be unbalanced and the following will occur. At the interval of time when point A is positive with respect to point B, point C will be more positive than point D due to the unbalance and currents will flow from point A through condition responsive variable inductance 51 and the power winding 54 of saturable reactor 52 to point C, dividing, part of it flowing through rectifier 65 and the control winding 57 of saturable reactor 53 to point D, thence through the power winding 55 of saturable reactor 53 and adjustable inductance 61 to point B, and the remainder flowing through inductance 63 to point B. During the same interval of time current will also flow from point A to point B through inductance 62, the power winding 55 of saturable reactor 53, and adjustable inductance 61. The current flowing through the control winding 57 of saturable reactor 53 lowers the reactance of the same and further unbalances the bridge network. Due to this great unbalance, point C and D are at greatly different levels of potential, point C being more positive than point D and consequently current will flow from point C, through lead 34, primary 31 of output transformer 30 and lead 35 to point D thus energizing load device 33.

At the interval of time when point B is positive with respect to point A, point D will be more positive than point C due to the unbalance and the following will occur. Current will flow from point B through adjustable inductance 61 and the power winding 55 of saturable reactor 53 to point D, dividing, part of it flowing through inductance 62 to point A and the remainder flowing through rectifier 64 and the control winding 56 of saturable reactor 52 to point C, thence through the power winding 54 of saturable reactor 52 and condition responsive variable inductance 51 to point A. During the same interval of time current will also flow from point B to point A through inductance 63, the power winding 54 of saturable reactor 52, and the condition responsive variable inductance 51. The unidirectional current flowing through control winding 56 of saturable reactor 52 lowers the reactance of the same and further unbalances the bridge, causing a substantial amount of current to flow from point D through lead 35, primary 31 of output transformer 30, and lead 34 to point C, thus energizing the load device 33.

When conditions are such that condition responsive variable inductance 51 increases in reactance the bridge tends to become unbalanced and the following will occur. At the interval of time when point A is positive with respect to point B, point D will be more positive than point C due to the unbalance and current will flow from point A through inductance 62 to point D, dividing, part of it flowing through the power winding 55 of saturable reactor 53 and adjustable inductance 61 to point B, and the remainder flowing through rectifier 64 and the control winding 56 of saturable reactor 52 to point C and thence through inductance 63 to point B. During the same interval of time current will also flow from point A to point B through condition responsive variable inductance 51, the power winding 52 of saturable reactor 54, and inductance 63. The unidirectional current flowing through the control winding 56 of saturable reactor 52 lowers the reactance of the same and tends to keep the bridge in balance. Actually the bridge is slightly unbalanced during the above action, a small amount of unbalance being required to maintain a flow of control current through the control winding 56 of saturable reactor 52. However, load device 33 is not activated for low levels of potential difference between the output terminals, points C and D, and for all practical purposes, the bridge has remained in balance.

At the interval of time when point B is positive with respect to point A, point C will be more positive than point D due to the unbalance and current will flow from point B through inductance 63 to point C, dividing, part of it flowing from point C to point A through the power winding 54 of saturable reactor 52 and the condition responsive variable inductance 51 and the remainder flowing through the rectifier 65 and the control winding 57 of saturable reactor 53 to point D and thence through inductance 62 to point A. During the same interval of time current will also flow from point B to point A through adjustable inductance 61, the power winding 55 of saturable reactor 53, and inductance 62. The unidirectional current flowing through the control winding 57 of saturable reactor 53 lowers the reactance of the same and tends to keep the bridge near balance by virtue of the fact that the ratio of the reactance arm AC to arm CB is very nearly the same as the ratio of the reactances of arm AD to arm DB. Since the bridge is continuously near balance, there will be no appreciable difference of potential between output terminals C and D and consequently load device 33 will not be energized.

The circuitry of the bridge network shown in Figure 4 is quite similar to that of Figure 3, the difference being in the addition of biasing windings 58 and 59 to saturable reactors 52 and 53 respectively. As was in the case of Figure 2, above described, the addition of properly energized biasing windings to the saturable reactors 52 and 53 reverses the characteristics of the saturable reactors. That is, provided that the magnetic effect of the biasing windings is opposite to the magnetic effect developed by the unidirectional current flowing through the control windings, the operation will be such that the unidirectional current flowing through the control windings will tend to increase the reactance of the saturable reactor instead of decreasing the reactance of the same as was the case of the network shown in Figure 3. By virtue of this, the operation of the bridge network shown in Figure 4 will be the reverse of the operation of the bridge network shown in Figure 3. That is, for an increase in the inductance and consequently the reactance of condition responsive variable inductance 51, the bridge network will become greatly unbalanced causing point C and B to be at different levels of potential and consequently energizing load device 33. Conversely, when the reactance of condition responsive variable inductance 51 decreases, the components of the bridge network will compensate for the decrease and the bridge will remain in balance, point C and D will remain at the same level of potential, and load device 33 will not be energized.

The operation of the bridge network shown in Figure 4 will be similar to that of the network shown in Figure 3 if the energization of the biasing windings 58 and 59 is such that their magnetic effects are additive to the magetic effects produced by the control windings 56 and 57. In this case, the network shown in Figure 4 would be more sensitive than that of Figure 3.

In considering this invention it should be kept in mind that the present disclosure is intended to be illustrative only and the scope of the invention is to be determined only by the appended claims.

What I claim is:

1. In a device of the class described, a normally balanced bridge network including four legs, input terminals, output terminals, a condition responsive variable reactor in one of said legs, a saturable reactor including a control winding in each of the legs adjoining said one of said legs, an adjustable reactor in the last of said legs, asymmetrically conductive means reversibly connected across said output terminals, said last named means being respectively serially connected with said control windings of said saturable reactors, means adapted to be energized by an alternating current connected to said input terminals, and a current responsive device connected to said output terminals, a substantial voltage being developed at said output terminals when said condition responsive variable reactors is varied in one sense, and no appreciable voltage being developed at said output terminals when said condition responsive variable reactor is varied in the sense opposite to said one sense.

2. In a device of the class described, a normally balanced bridge network comprising four legs, input terminals, output terminals, first and second saturable reactors each including a power winding and a control winding, a condition responsive variable reactor and said power winding of said first saturable reactor connected in series in one of said legs, an adjustable reactor and said power winding of said second saturable reactor connected in series in the leg opposite said one of said legs, reactors in the other two legs, asymmetrically conductive means reversibly connected to said output terminals, said control windings of said saturable reactors being serially connected with said asymmetrically conductive means, means adapted to be energized by an alternating current connected to said input terminals, and a current responsive device connected to said output terminals.

3. In a device of the class described, a normally balanced bridge network including four legs, input terminals, output terminals, a condition responsive variable reactor in one of said legs, a saturable reactor including a control winding in each of the legs adjoining said one of said legs, an adjustable reactor in the last of said legs, asymmetrically conductive means reversibly connected to said output terminals, said last named means being respectively serially connected with said control windings of said saturable reactors, means adapted to be energized by an alternating current connected to said input terminals, and a current responsive device connected to said output terminals, said network retaining its balance under conditions of a decrease of the reactance of said condition responsive variable reactor and becoming unbalanced under conditions of an increase of the reactance of said condition responsive variable reactor.

4. In a device of the class described, a normally balanced bridge network including four legs, input terminals, output terminals, a condition responsive variable reactor in one of said legs, a saturable reactor including a control winding and a biasing winding in each of the legs adjoining said one of said legs, a reactor in the remaining leg, asymmetrically conductive means reversibly connected to said output terminals, said last named means being respectively serially connected with said control windings of said saturable reactors, means adapted to be energized by an alternating current connected to said input terminals, means adapted to be actuated by an unbalance of said network connected to said output terminals, and means unidirectionally energizing said biasing windings of said saturable reactors such that the biasing winding and the control winding of each of said saturable reactors are respectively opposite to one another in magnetic effect, said network remaining balanced under conditions of an increase of the reactance of said condition responsive variable reactor, and said network becoming greatly unbalanced under conditions of a decrease of the reactance of said condition responsive variable reactor.

5. In a device of the class described, a normally balanced bridge network comprising four legs, input terminals, output terminals, first and second saturable reactors each including a power winding, a control winding, and a biasing winding, a condition responsive variable reactor and said power winding of said first saturable reactor connected in series in one of said legs, an adjustable reactor and said power winding of said second saturable reactor connected in series in the leg opposite said one of said legs, reactors in the remaining two legs, asymmetrically conductive means reversibly connected to said output terminals, said control windings of said saturable reactors serially connected with said asymmetrically conductive means, means adapted to be energized by an alternating current connected to said input terminals, means adapted to be actuated by an unbalance of said network connected to said output terminals, and means unidirectionally energizing said biasing windings on said saturable reactors such that said biasing windings and said control windings of each of said saturable reactors are respectively opposite to one another in magnetic effect, said network remaining balanced under conditions of a decrease of the reactance of said condition responsive variable reactor, and said network becoming unbalanced under conditions of an increase of the reactance of said condition responsive variable reactor.

6. In a device of the class described, a condition responsive variable reactor, biased saturable reactors, and an adjustable reactor connected as in the four arms of a bridge network with said saturable reactors being in opposite arms of said network and said network being normally balanced, asymmetrically conductive means reversibly connected to a first pair of terminals of said network, control winding means on said saturable reactors serially connected with said asymmetrically conductive means, means adapted to be energized by an alternating current voltage connected to a second pair of terminals of said network, and means adapted to be energized by an unbalance of said network connected to said first pair of terminals of said network, said network remaining balanced for an increase in the reactance of said condition responsive variable reactor, and said network intensifying the unbalance caused by a decrease of the reactance of said condition responsive variable reactor.

7. In a device of the class described, a normally balanced inductive reactance bridge including a condition responsive variable inductance, saturable inductances adjacent to said condition responsive variable inductance, and an adjustable inductance; asymmetrically conductive means reversibly connected to a first pair of terminals of said bridge; control windings of said saturable inductances serially connected with said asymmetrically conductive means; means adapted to be energized by an alternating current voltage connected to a second pair of terminals of said bridge; means adapted to be operated by an unbalance of said bridge connected to said first pair of terminals; said bridge remaining substantially balanced for a decrease of the reactance of said condition responsive variable inductance, and said bridge becoming appreciably unbalanced for an increase of the reactance of said condition responsive variable inductance.

8. In a device of the class described, a normally balanced bridge network comprising a condition responsive variable inductance, saturable inductances including biasing windings and control windings, inductance means, asymmetrically conductive means, means adapted to be energized by an alternating current voltage, and means adapted to be actuated by an unbalance of said bridge network, said asymmetrically conductive means and said control windings effecting said saturable reactors such that said network retains its said normally balanced characteristic for a variation in one sense only of said condition responsive variable inductance.

9. In a device of the class described, a normally balanced bridge network comprising a condition responsive variable inductance, saturable inductances including control windings, inductance means, asymmetrically conductive means, means adapted to be energized by an alternating current voltage, and means adapted to be actuated by an unbalance of said bridge network, said asymmetrically conductive means and said control winding effecting said saturable reactors such that said network retains its said normally balanced characteristic for a variation in one sense only of said condition responsive variable inductance.

10. In a device of the class described, a bridge network having input terminals adapted to be energized by an alternating current voltage and output terminals, said network comprising inductive means including saturable reactor means positioned so that the ratio of the reactance of a first arm to the reactance of a second arm is equal to the ratio of the reactance of a third arm to the reactance of a fourth arm, and asymmetrically conductive means and control winding means included in said saturable reactor means connected between said output terminals cooperating so as to retain substantially the equality of said ratios for a variation in one sense of said inductive means and to unbalance the equality of said ratios for a variation of said inductive means in a sense opposite to said one sense.

11. In a device of the class described, a normally balanced bridge network including four legs, input terminals, output terminals, a condition responsive variable reactor in one of said legs, a saturable reactor including a control winding and a biasing winding in each of the legs adjoining said one of said legs, a reactor in the remaining leg, asymmetrically conductive means reversibly connected to said output terminals, said last named means being respectively serially connected with said control windings of said saturable reactors, means adapted to be energized by an alternating current connected to said input terminals, means adapted to be actuated by an unbalance of said network connected to said output terminals, and means unidirectionally energizing said biasing windings of said saturable reactors such that the biasing windings and the control winding of each of said saturable reactors are respectively additive to one another in magnetic effect, said network remaining balanced under conditions of a decrease of the reactance of said condition responsive variable reactor, and said network becoming greatly unbalanced under conditions of an increase of the reactance of said condition responsive variable reactor.

12. In a device of the class described, a normally balanced bridge network comprising four legs, input terminals, output terminals, first and second saturable reactors each including a power winding, a control winding, and a biasing winding, a condition responsive variable reactor and said power winding of said first saturable reactor connected in series in one of said legs, an adjustable reactor and said power winding of said second saturable reactor connected in series in the leg opposite said one of said legs, reactors in the remaining two legs, asymmetrically conductive means reversibly connected to said output terminals, said control windings of said saturable reactors serially connected with said asymmetrically conductive means, means adapted to be energized by an alternating current connected to said input terminals, means adapted to be actuated by an unbalance of said network connected to said output terminals, and means unidirectionally energizing said biasing windings on said saturable reactors such that said biasing windings and said control windings of each of said saturable reactors are respectively additive to one another in magnetic effect, said network remaining balanced under conditions of an increase of the reactance of said condition responsive variable reactor, and said network becoming unbalanced under conditions of a decrease of the reactance of said condition responsive variable reactor.

13. In a device of the class described, a normally balanced adjustable bridge network comprising four legs, input terminals, output terminals, a condition responsive variable reactor, saturable reactor means including control means, inductance means, asymmetrically conductive means, means adapted to be energized by an alternating current connected to said input terminals, and means adapted to be actuated by an unbalance of said bridge network connected to said output terminals, said asymmetrically conductive means and said control means serially connected between said output terminals and effecting said saturable reactors such that said network remains substantially balanced for a variation in one sense of the magnitude of the reactance of said condition responsive variable reactor and becomes substantially unbalanced for a variation in the sense opposite to said one sense of the magnitude of the reactance of said condition responsive variable reactor.

14. Apparatus of the class described comprising: a normally balanced bridge network having two spaced points of the same electrical potential when said bridge network is in said normally balanced condition; said network comprising a condition responsive variable reactor, saturable reactor means including power winding means and control winding means, and asymmetrically conductive means; said control winding means and said asymmetrically conductive means being connected between said two spaced points; said network remaining in said normally balanced condition when said condition responsive variable reactor is varied in one sense and becoming unbalanced when varied opposite to said one sense.

References Cited in the file of this patent

UNITED STATES PATENTS

| Number | Name | Date |
|---|---|---|
| 2,403,891 | Lamm | July 9, 1946 |